(12) United States Patent
Escofet Via et al.

(10) Patent No.: US 11,416,240 B2
(45) Date of Patent: Aug. 16, 2022

(54) FIRE AND SECURITY SYSTEM INCLUDING ADDRESSABLE LOOP AND AUTOMATIC FIRMWARE UPGRADE

(71) Applicant: Carrier Corporation, Jupiter, FL (US)

(72) Inventors: Jordi Escofet Via, Barcelona (ES); Jordi Castells Moreno, Barcelona (ES); Santiago Vilarrubla Canals, Barcelona (ES)

(73) Assignee: CARRIER CORPORATION, Palm Beach Gardens, FL (US)

( * ) Notice: Subject to any disclaimer, the term of this patent is extended or adjusted under 35 U.S.C. 154(b) by 357 days.

(21) Appl. No.: 16/640,416

(22) PCT Filed: Aug. 21, 2018

(86) PCT No.: PCT/US2018/047148
§ 371 (c)(1),
(2) Date: Feb. 20, 2020

(87) PCT Pub. No.: WO2019/040392
PCT Pub. Date: Feb. 28, 2019

(65) Prior Publication Data
US 2020/0249934 A1     Aug. 6, 2020

(30) Foreign Application Priority Data
Aug. 21, 2017  (EP) .................................. 17382580

(51) Int. Cl.
*G06F 9/44*  (2018.01)
*G06F 8/654*  (2018.01)
*G06F 8/656*  (2018.01)

(52) U.S. Cl.
CPC .............. *G06F 8/654* (2018.02); *G06F 8/656* (2018.02)

(58) Field of Classification Search
None
See application file for complete search history.

(56) References Cited

U.S. PATENT DOCUMENTS 6,772,364 B1   8/2004   Pinter et al.
6,832,373 B2  12/2004   O'Neill
(Continued)

FOREIGN PATENT DOCUMENTS

CN   106209934 A   12/2016
WO     0017749 A1    3/2000

OTHER PUBLICATIONS

European Search Report for European Application No. 17382580.3; Application Filing Date Aug. 21, 2017; dated Feb. 27, 2018 (10 pages).

(Continued)

*Primary Examiner* — Qamrun Nahar
(74) *Attorney, Agent, or Firm* — Cantor Colburn LLP (57) ABSTRACT

A fire and security system includes a control panel and one or more connected device. The control panel is in signal communication with a data control loop. The connected device is in signal communication with the at least one control panel via the at least one data control loop. The connected device includes a memory unit having a free memory area that stores first data and an active memory area that stores second data different from the first data. In response to operating the connected device according to the second data, the at least one connected device receives updated data delivered by the at least one of the control panel over the data control loop, and replaces the first data stored in the free memory data with the updated data.

15 Claims, 5 Drawing Sheets

(56) References Cited

U.S. PATENT DOCUMENTS

| | | |
|---|---|---|
| 7,103,529 B2 | 9/2006 | Zimmer |
| 7,555,749 B2 | 6/2009 | Wickham et al. |
| 7,840,768 B2 | 11/2010 | Stiffler et al. |
| 8,194,592 B2 | 6/2012 | Kore et al. |
| 8,289,161 B2 | 10/2012 | Hosey |
| 8,549,510 B2 | 10/2013 | Ohama et al. |
| 8,594,850 B1 | 11/2013 | Gourlay et al. |
| 8,606,995 B2 | 12/2013 | Sharma et al. |
| 8,607,219 B2 | 12/2013 | Minegishi |
| 8,705,716 B2 | 4/2014 | Gregory |
| 8,707,297 B2 | 4/2014 | Brown et al. |
| 8,769,525 B2 | 7/2014 | Dirstine et al. |
| 8,869,138 B2 | 10/2014 | Bandakka et al. |
| 8,884,771 B2 | 11/2014 | Cooke et al. |
| 8,892,699 B2 | 11/2014 | Mann |
| 8,893,115 B2 | 11/2014 | Nagamine et al. |
| 8,966,952 B2 | 3/2015 | Pepper |
| 8,972,973 B2 | 3/2015 | Cavalaris et al. |
| 8,978,024 B2 | 3/2015 | Bower, III et al. |
| 9,456,297 B2 | 9/2016 | Pi-Sunyer |
| 9,471,300 B2 * | 10/2016 | Mangaiahgari ............ G06F 8/62 |
| 2003/0217254 A1 * | 11/2003 | Page ............................ G06F 8/60 |
| | | 713/2 |
| 2010/0031243 A1 * | 2/2010 | Jakubowski ................ G06F 8/65 |
| | | 711/E12.001 |
| 2010/0332816 A1 * | 12/2010 | Murray ..................... H04L 67/34 |
| | | 713/2 |
| 2011/0016291 A1 * | 1/2011 | Kuo ......................... G06F 9/342 |
| | | 711/E12.078 |
| 2011/0137435 A1 | 6/2011 | Furusawa |
| 2012/0042307 A1 | 2/2012 | Shao |
| 2012/0060151 A1 | 3/2012 | Oh et al. |
| 2013/0321161 A1 | 12/2013 | Chen |
| 2014/0282486 A1 | 9/2014 | Hisamoto et al. |
| 2015/0142898 A1 * | 5/2015 | Piccolo, III ............. G08B 17/00 |
| | | 709/204 |
| 2016/0132322 A1 | 5/2016 | Jones et al. |
| 2016/0300460 A1 * | 10/2016 | Kulkarni ................. G08B 25/14 |
| 2021/0241595 A1 * | 8/2021 | Young ..................... G08B 17/00 |
| 2021/0294624 A1 * | 9/2021 | Gray ......................... G06F 8/61 |

OTHER PUBLICATIONS

International Search Report and Written Opinion for PCT Application No. PCT/US2018/047148; Application Filing Date Aug. 21, 2018; dated Dec. 4, 2018 (16 pages).

Jain et al., "Infield firmware update: Challenges and solutions" 2016 International Conference on Communication and Signal Processing (ICCSP). IEEE, Apr. 6, 2016 (pp. 1232-1236).

* cited by examiner

FIG. 5

FIRE AND SECURITY SYSTEM INCLUDING ADDRESSABLE LOOP AND AUTOMATIC FIRMWARE UPGRADE

CROSS-REFERENCE

This application is a National Stage of International Application Serial No. PCT/US2018/047148, filed Aug. 21, 2018, which claims priority to European Application Serial No. 17382580.3, filed Aug. 21, 2017, the contents of which are hereby incorporated by reference in its entirety.

BACKGROUND

Fire and security systems can include one or more control panels that electronically communicate with several different security devices via a data control loop. The individual security devices are installed with device firmware programs (also referred to as firmware). Firmware is an executable device program, which can control the functionality of a given device and can allow the security device to exchange data with the control panel via the data control loop according to set protocol. Overtime, the firmware of the security devices can become outdated which may result in operating faults. Therefore, the firmware of the security devices installed in the fire and security system may be routinely upgraded. Current solutions for maintaining security devices with up-to-date firmware include manually uploading an upgraded version of the firmware to a specific security device, or replacing the security device all together with a new up-to-date security device. These, solutions, however, realize excessive costs and may require that the security device be taken off-line for a period of time.

SUMMARY

According to a non-limiting embodiment, a control system includes a control panel in signal communication with a data control loop, and a connected device in signal communication with the at least one control panel via the at least one data control loop. The connected device includes a memory unit having a free memory area that stores first data and an active memory area that stores second data different from the first data. In response to operating the connected device according to the second data, the at least one connected device receives updated data delivered by the at least one of the control panel over the data control loop, and replaces the first data stored in the free memory data with the updated data.

The control system may include an additional feature, wherein in response to initially connecting the connected device to the data control loop, the device controller is configured to select the second data from the active memory area and initiate operation of the connected device according to the second data.

The control system may include an additional feature, wherein after initiating operation of the connected device according to the second data, the device controller replaces the first data stored in the free memory area with the updated data received via the at least one data control loop.

The control system may include an additional feature, wherein the first data corresponds to a first firmware program and, and the second data corresponds to a second firmware program different from the first firmware program, and wherein the data control loop is an addressable control loop.

The control system may include an additional feature, wherein the device controller initiates operation of the at least one connected device in response to selecting first data from the active memory area, and replaces second data stored in the free memory area.

The control system may include an additional feature, wherein the connected device transitions the free memory area into an active memory area, and operates according to data stored in the transitioned active memory area, and transitions the active memory area into a free memory area and replaces the data in the transitioned free area with updated data.

The control system may include an additional feature, wherein replacing the second device data further includes receiving the second updated device data via the addressable control loop in response to a command from the control panel.

The control system may include an additional feature, wherein in response to initially connecting the connected device to the data control loop, the device controller is configured to select the second device data from the active memory area and invoke operation of the connected device according to the second device data.

The control system may include an additional feature, wherein after invoking operation of the connected device according to the second device data, the device controller replaces the first device data stored in the free memory area with updated data.

The control system may include an additional feature, wherein the updated data corresponds to at least one of the firmware program and functionality of the device.

According to another non-limiting embodiment, a connected device installed in a control system, comprises a data input port, a free memory area, and active memory area and a device controller. The data input port that receives data from a data control loop installed in the control system. The free memory area is configured to store a first firmware program. The active memory area is different from the free memory area, and is configured to store a second firmware program that is different from the first firmware program. The device controller is configured to operate the connected device in response to executing the second firmware program, and receive an updated firmware program from the data control loop in response to operating the connected device according to the second firmware program. The device controller further replaces the first firmware program stored in the free memory data with the updated firmware program while operating according to the second firmware program.

The connected device may include an additional feature, wherein in response to initially connecting the connected device to the data control loop, the device controller is configured to select the second firmware program from the active memory area and initiate operation of the connected device according to the second firmware program, and after initiating operation of the connected device according to the second firmware program the device controller replaces the first firmware program stored in the free memory area with updated firmware program received via the at least one data control loop.

The connected device may include an additional feature, wherein the data control loop is an addressable control loop, and wherein the device controller operates the connected device in response to selecting the first firmware program from the free memory area, and replaces second firmware program stored in the active memory area.

The connected device may include an additional feature, wherein replacing the second firmware program includes selecting the first firmware program, invoking operation of the connected device according to the first firmware program, and replacing the second firmware program with second updated firmware program while the connected device operates according to the first firmware program.

The connected device may include an additional feature, wherein in response to initially connecting the connected device to the data control loop, the device controller is configured to select the second firmware program from the active memory area and initiate operation of the connected device according to the second firmware program, and after initiating operation of the connected device according to the second firmware program, the device controller replaces the first firmware program stored in the free memory area with updated firmware program.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Control systems operating within buildings may include fire and/or security components which can include one or more control panels that electronically communicate with several different connected devices via a data control loop. Such systems or components may be colloquially referred to as fire and security systems, although they may include other functionality including integration with or control of other building systems such as HVAC, electrical, communication, and other systems. Various examples provide a control system capable of updating the firmware of a connected device through the control loop. The connected device capable of being upgraded may include at least one memory control unit including a divided firmware memory map. The firmware memory map is divided into different areas or individual partitions. The individual memory partitions include, for example, an active memory partition and a free memory partition. The divided memory firmware memory map allows the fire and security system to operate normally while also upgrading the firmware of one or more connected devices using the control loop. In addition, the firmware upgrade process using the control loop provided by the fire and security system avoids the need to remove any connected device from its installed location within the system.

Figure 1:
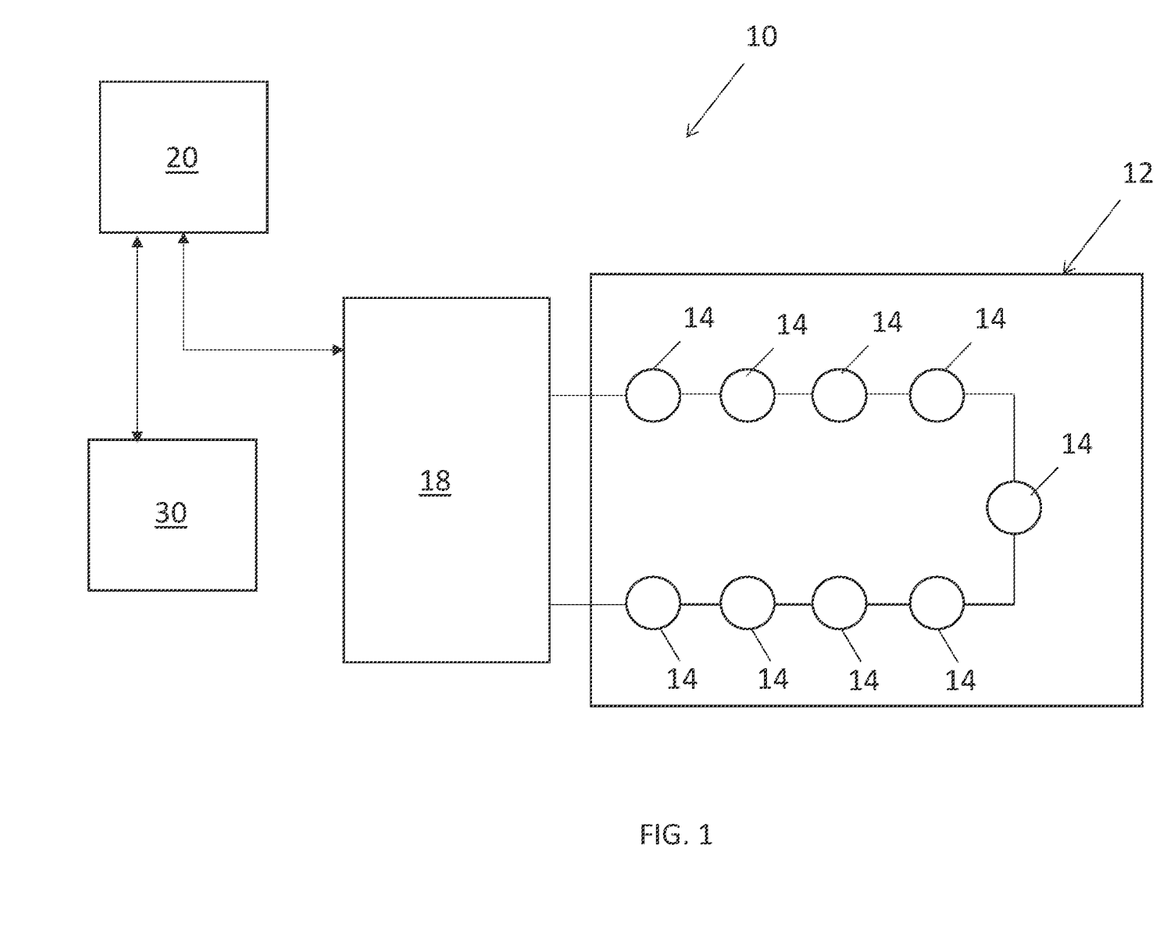
FIG. 1 is a diagram of a fire and security system including a data control loop configured to upgrade firmware of one or more connected devices according to a non-limiting embodiment.

Referring now to FIG. 1, an example of a fire and security system 10 is illustrated according to a non-limiting embodiment. In one or more embodiments, the fire and security system 10 includes an addressable fire system that implements and addressable control loop. The fire and security system 10 includes a control panel 18 in signal communication with a data security network 20 and a data control loop 12. The data security network 20 can include additional control panels, data communication networks, and external devices. The data security network 20 also allows the control panel 18 to exchange data with a central monitoring unit 30 and/or the other devices in signal communication with the network 20.

The data control loop 12 establishes a local data network including one or more connected devices 14 such as, for example, fire and/or security devices 14, which may collectively or individually be referred to as connected devices, fire devices, or security devices. The connected devices 14 may include, but are not limited to, detection devices such as smoke detectors, heat detectors, carbon monoxide (CO) detectors, and flame detectors, as well as notification devices. The detectors described above can be implemented using various sensors, camera devices, audio devices, etc. Notification devices may include horns, strobes, speakers, signs, screens, etc., to notify building occupants of emergencies and other situation or status and in some instances provide directions to respond to the communicated situation or status. In at least one embodiment, the data control loop includes an addressable data control loop capable of monitoring and controlling a plurality (e.g., several hundred) devices 14. In one or more embodiments, each device 14 installed on the data control loop 12 has its own identifier (i.e., address). In this manner, the control panel 18 can determine the state of each individual device connected to the data control loop 12.

The control panel 18 is configured to utilize the data control loop 12 in order to upgrade data stored in a divided memory unit installed on the given connected devices 14. In at least one embodiment, the control panel 18 utilizes the data control loop 12 to deliver commands and data with one or more of the devices 14. For example, the control panel 18 can utilize the data control loop 12 to transfer an executable data file, which is then used to upgrade the firmware program of the device 14. Accordingly, the system 10 is capable of operating normally while upgrading the device 14. In addition, a functionality, application and/or or firmware of one or more of the devices 14 can be upgraded using the data control loop 12 without requiring removal or shutting down of the device 14.

Figure 2:
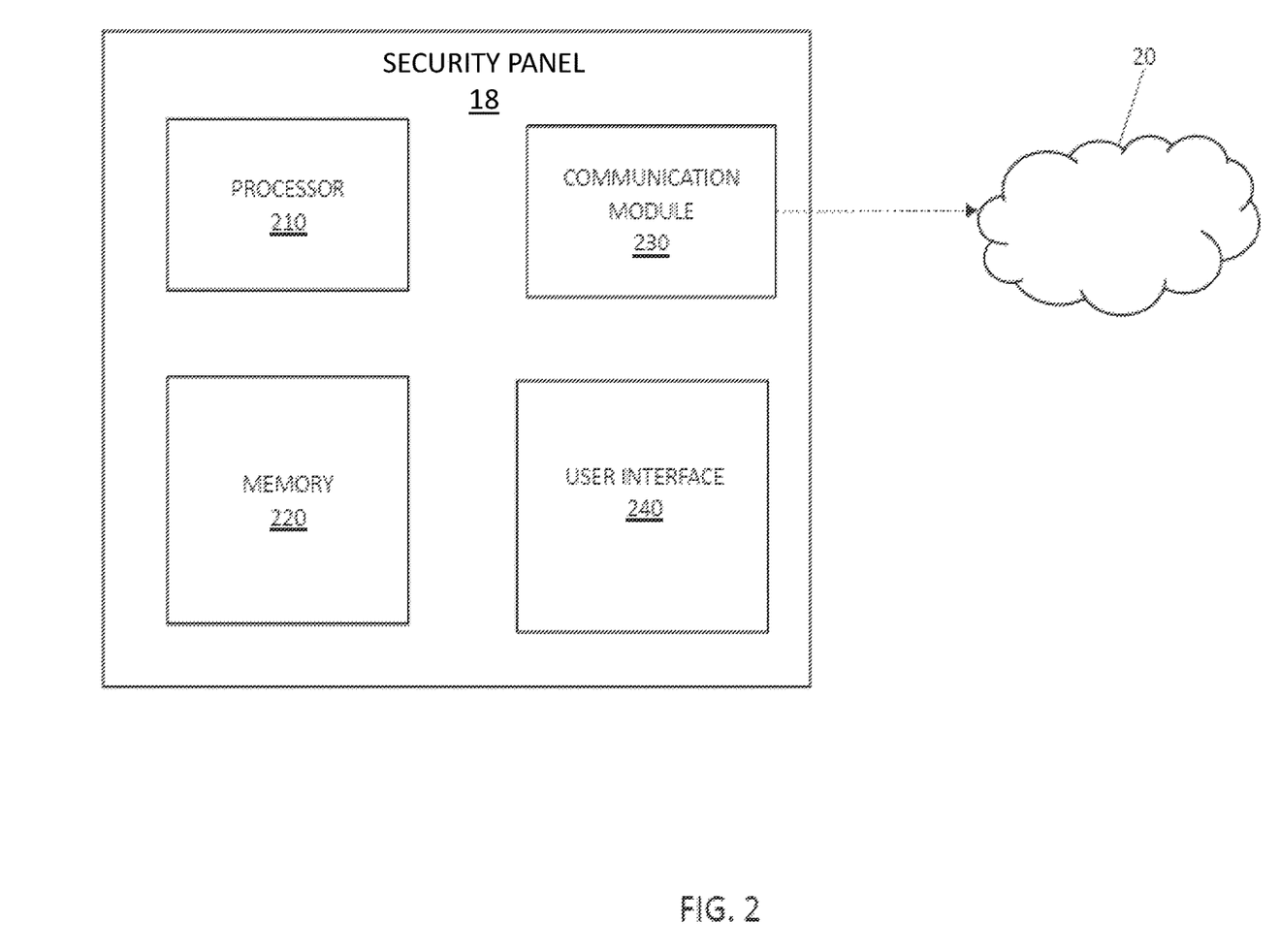
FIG. 2 is a block diagram of an electronic control panel included in the fire and security system according to a non-limiting embodiment.

Turning to FIG. 2, an example of an electronic control panel 18 included in the fire and security system 10 is illustrated according to a non-limiting embodiment the control panel 18 includes an electronic hardware processor 210, a memory unit 220, and communication module 230, and a user interface 240 (see FIG. 2). The processor 210 can execute control logic and perform data processing to perform the functions and techniques as discussed herein. For example, the processor 210 can execute commands received from a central monitoring unit (not shown in FIG. 2) and/or other devices. The executed commands include, for example, sending signals to activate motion sensors, activate alarms, lock doors, etc.

The processor 210 is in signal communication with the memory unit 220, the communication module 230, and the user interface 240. The memory unit 220 can be constructed as random-access memory (RAM) and is configured to store various data including, but not limited to, operating logic, threshold values, and firmware programs. One or more of these firmware programs can be routinely updated, so as to update the firmware and/or functionality of one or more connected devices as described in greater detail below. The communication module 230 establishes a wired and/or wireless data connection with one or more data networks 20. For example, the communication module 230 allows the processor 210 to communicate with the overall security network 20. In this manner, the control panel 18 can communicate with a central monitoring unit and/or the other devices in signal communication with the network 20.

The user interface 240 can be constructed as a graphical user interface (GUI) for example. The user interface 240 can include a display screen which facilitates interaction between an operator, installer, or the like, with the control panel 18. The user interface 240 may process, store, and/or transmit information via one or more interfaces and/or may be employed to control, calibrate, or otherwise configure the fire and security system 10.

Figure 3:
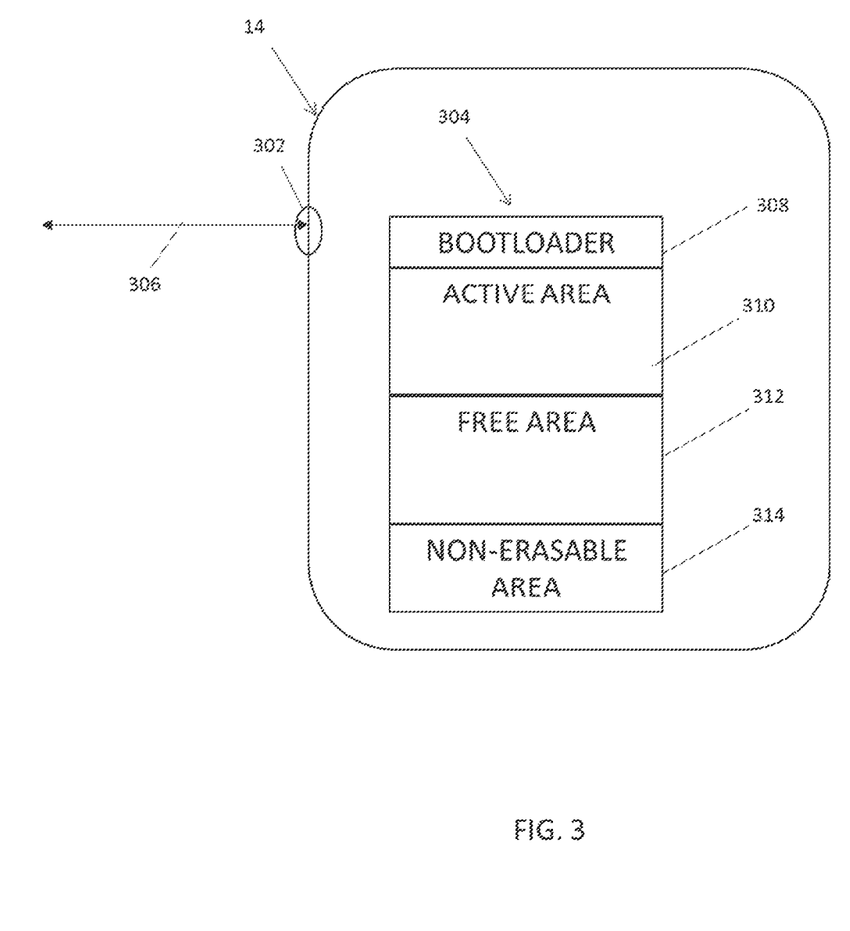
FIG. 3 is a block diagram of an example of a memory control unit included in a connected device according to a non-limiting embodiment.

Turning now to FIG. 3, a connected device 14 such as a security device 14, for example, is installed in a fire and security system is illustrated according to a non-limiting embodiment. The device 14 includes a data input port 302 and a memory control unit 304. The data input port 302 is configured to establish a data link with a data control loop 306. Establishing a data link between the device 14 and the data control loop 306 allows the device 14 to electrically or optically communicate with a respective control panel (not shown in FIG. 3) to exchange data.

The memory control unit 304 includes a controller 308 (also referred to as a "bootloader"), a first memory area 312, a second memory area 310, and a non-erasable storage area 314. Although three memory areas are shown to be included in the memory unit 304, it should be appreciated that more or fewer memory areas can be present, and may be distributed across multiple memory units 304 or be allocated to a specific memory unit 304.

In at least one example embodiment, the second memory area 310 operates as an active memory area (where the firmware is actively running) while the first memory area 312 operates a free memory area that is available to store new or 'incoming' firmware. Once the new or incoming firmware is installed in the free memory area 312, the controller 308 confirms that the upgraded firmware is valid and can execute a firmware 'switch', i.e., can automatically initiate the newly upgraded firmware installed on the connected device 14. In this manner, the device 14 can actively operate according to a state-of-the art (SOTA) firmware program stored in second memory area 310 (e.g., the active memory area), while also operating (e.g., simultaneously) to update the data stored in the first memory area 312 (e.g., the free memory area).

The first memory area 312 can also store a second program that provides an additional or alternative device functionality. The device 14 can dynamically access the first memory area 312 in order to invoke the added functionality provided by the data stored in the first memory area 312. In this manner, the first memory area 312 is able to provide a device 14 with dual functionality.

In one or more embodiments, the device 14 is capable of dynamically selecting to operate from the second memory area 310 to the first memory area 312. In this manner, the second memory area 310 transitions into the free memory area while the first memory area 312 transitions into the active memory area. Accordingly, the device 14 can actively operate according to the data stored in first memory area 312 (e.g., now the active memory area), while also operating (e.g., simultaneously) to update the data stored in the second memory area 310 (e.g., now the free memory area).

The non-erasable storage area 314 can include read-only memory capable of storing non-erasable data. The non-erasable storage area 314 can also include a limited-writeable memory that can be written to a limited number of times. The non-erasable data includes, but is not limited to, serial number, device type, date of manufacturing, hours of operation, system configuration data, and calibration data. serial number can be used to allocate automatic addresses if there are no repeated serial numbers. Hours of operation can be used to prompt for a service or replacement. Device type data can be used to indicate the capabilities/characteristics of the device. The non-erasable storage area 314 can also store calibration data installing during the initial manufacturing stage of the device 14. The calibration data typically does not change significantly over the life of the device 14. The calibration data can include various algorithms that control whether the device in a normal mode (e.g., stand-by mode) or an alert mode (e.g., in response to detecting a security alert), for example.

The controller 308 has full access to one or more of the memory areas 310, 312, and 314 described above. The controller 308 can be configured as an independent hardware memory controller (sometimes referred to as a bootloader) that controls the memory areas 310, 312, and 314, or can be configured as a main device controller that controls the memory unit 304, along with other features or components of the device 14.

The controller 308 is configured to upgrade the firmware of the connected device 14 using data link established via the data control loop 306. The controller 308 can initiate the firmware upgrade in response to a command manually input by an authorized maintenance technician and/or automatically. the controller 308 can utilize the data control loop 306 to replace data (e.g., a first firmware program) stored in the first memory area 312 and/or the data (e.g., second firmware program) stored in the second memory area 310 with updated data (e.g., updated firmware program). Accordingly, the firmware of the device 14 can be seamlessly updated without needing to take the device 14 off-line, or without the need to completely replace the device with a new or updated device.

Figure 4:
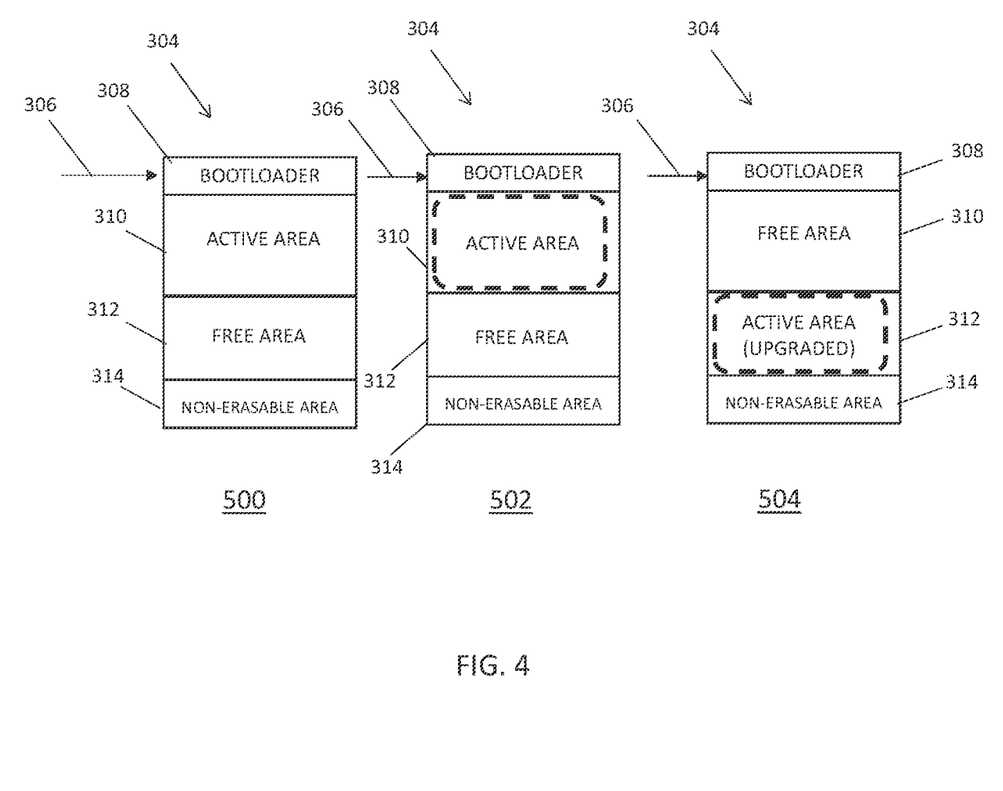
FIG. 4 is a block diagram illustrating an example process flow to automatically upgrade the firmware of a connected device included in a fire and security system according to a non-limiting embodiment.

Referring to FIG. 4, a process flow of a memory unit 304 undergoing a firmware upgrade is illustrated according to a non-limiting embodiment. Although the firmware upgrade is described using an example of updating various firmware programs of the device, the invention is not limited thereto. It should be appreciated that in other examples, the entire operation and/or of a device 14 can be updated by updating the data stored in the first memory area 312 and/or the second memory area 310.

At a first stage (500), the memory unit 304 is shown in an initial configuration. Accordingly, the first memory area 312 stores a first firmware program and the second memory area 310 stores a second firmware program. The firmware of the memory unit 304 can be automatically upgraded from an initial configuration in response to connecting the device 14 to the data control loop 306. For example, in response to initially connecting the device 14 to the data control loop 306, the controller 308 selects the second firmware program from the second memory area 310 (as indicated by the dashed selector box at stage 502), and initiates operation of the device 14 according to the second firmware program.

Once the initial second firmware program is initialized, the controller 308 replaces the first firmware program stored in the first memory area 312 with an updated version of the first firmware program (e.g., updated SOTA firmware program).

As described above, data control loop 306 can be utilized to automatically upgrade the firmware of the memory unit 304 based on a decision performed by the control panel. In at least one non-limiting embodiment, a control panel (not shown in FIG. 4) connected to the data control loop initiates a firmware update of one or more device 14. The control panel and a device 14 can exchange data packets that convey various metadata including, but not limited to, requests for a most up-to-date version of a specific device firmware program, the type of device receiving the firmware upgrade, the location of the device receiving the firmware upgrade, etc.

The control panel (not shown in FIG. 4) can upgrade device firmware program and deliver it to the device 14 via the data control loop 306. The control panel can obtain the upgraded device firmware program from internal memory and/or from an external device connected to the system network. Accordingly, the firmware of the memory unit 304 is upgraded by replacing the first firmware program that was stored in the first memory area 312 during a default factory configuration with updated firmware program (e.g., updated SOTA firmware program). The controller 308 can then choose to select the updated SOTA firmware program from the first memory area 312 so as to operate the device according to the most up-to-date version of the SOTA firmware program.

In at least one embodiment, once the controller 308 replaces the initial data (e.g., the initial first firmware program) with the updated data (e.g., the updated SOTA firmware program) stored in the first memory area 312 (as indicated by the solid box indicator at stage 502), the controller 308 selects the updated device firmware program from first memory area 312 (as indicated by the dashed selector box at stage 504) and initiates operation of the device 14 according to the updated device firmware program (e.g., the updated SOTA firmware program). As descried herein, the controller 308 can utilize the data control loop 306 to facilitate an automatic upgrade of the firmware. The controller 308 can also use the data control loop 306 to replace the initial firmware program contained in the second memory area 310 with a new or updated firmware program.

For example, the control panel can initiate a second firmware upgrade to update the second memory area 310 data using the data control loop 306. Accordingly, the control panel delivers the updated firmware program to the device 14 via the data control loop 306, which then replaces the initial firmware program (e.g., the initial SOTA firmware program) as indicated by the solid box indicator at stage 504, which was previously stored in the second memory area 310 during the default factory configuration.

As described above, an active memory area (e.g., the second memory area 310) can dynamically be transitioned into a free memory area, while the free memory area (e.g., the first memory area 312) can be transitioned into the active memory area. In this manner, the device 14 can operate according to the data stored in the first memory area 312 (e.g., now the active memory area) while updating the data stored in the second memory area 310 (e.g., now the free memory area).

Figure 5:
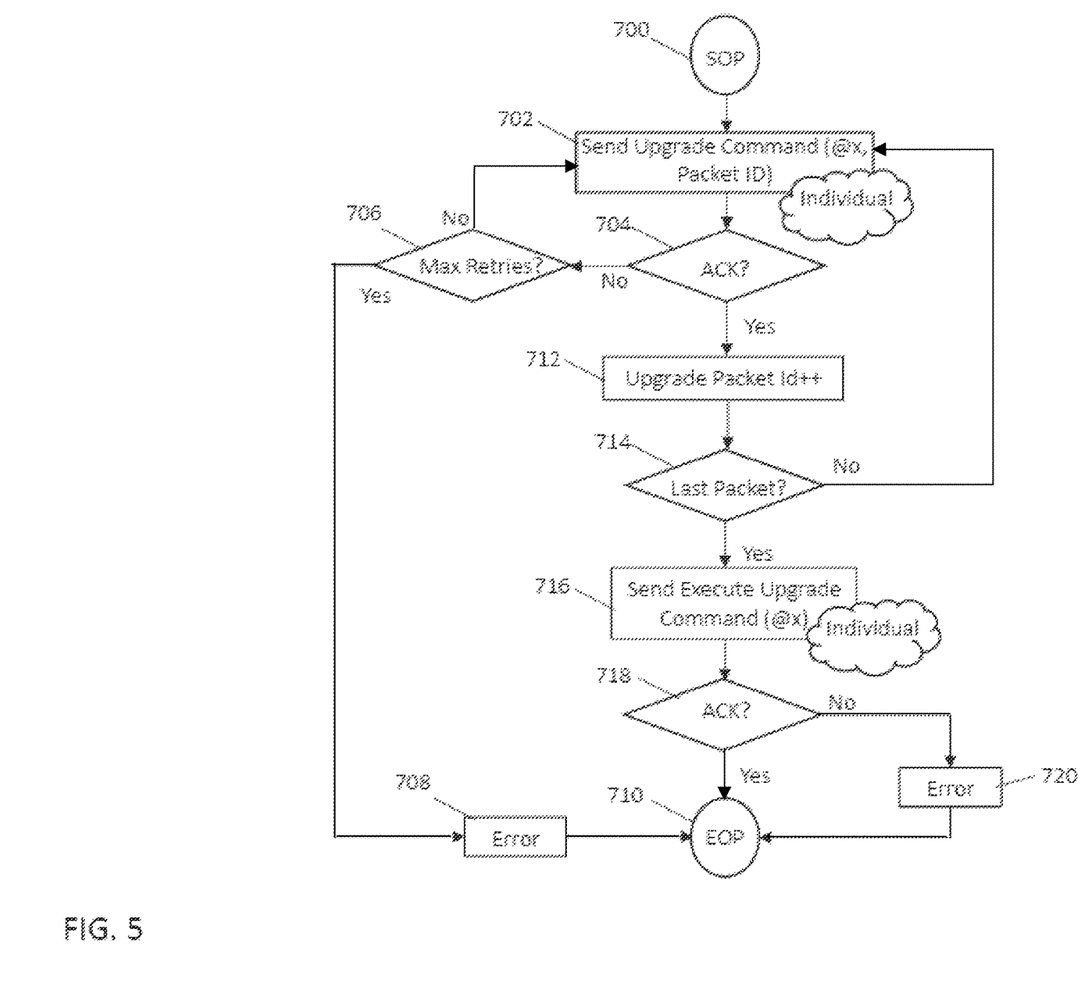
FIG. 5 is a flow diagram illustrating a method of automatically upgrading the firmware of a connected device included in a fire and security system according to a non-limiting embodiment.

Turning now to FIG. 5, a flow diagram illustrates a method of automatically upgrading the firmware of a device connected to a data control loop included in a fire and security system according to a non-limiting embodiment.

The method begins at operation 700, and at operation 702, a device upgrade signal is output to the data control loop via the control panel. The device upgrade signal indicates a device upgrade procedure has been initiated by the control panel. The device upgrade signal may include data packets identifying an existing data to be updated, or requesting a specific firmware program that will replace the firmware program currently stored in the device. At operation 704, a determination is made as to whether an acknowledgement (ACK) signal is received from the device to be upgraded. When the ACK signal is not received, the control panel attempts to resend the device upgrade signal at operation 706. When the number of resend attempts exceeds a threshold value, no further firmware update signals are output at operation 706, and at operation 708, an error message indicating a failed firmware upgrade attempt is generated by the control panel and/or one or more other devices included in the fire and security system, and the method ends at operation 710.

When, however, the number of resend attempts is less than or equal to the threshold value at operation 706, the device upgrade signal is again output to the data control loop at operation 702, and the control panel determines if an ACK signal is received at operation 704. Once the ACK signal is received, data packets corresponding to the requested updated data are delivered over the data control loop and are received by the device at operation 712. At operation 714, a determination is made as to whether the last data packet included of the updated data transmission event is received by the device. When the last data packet has not been received, the method returns to operation 702 and continues the process of requesting data packets corresponding to the updated data.

When, however, the last data packet is received at operation 714, the device selects the updated data from the corresponding memory area, and automatically initiates the new device functionality provided by the installed updated data. The new functionality may include, for example, establishing communication with the data control loop according to an upgraded firmware program corresponding to the updated data at operation 716. At operation 718, the device outputs a second ACK signal requesting that the fire and security system acknowledge its presence on the data control loop. When an ACK signal is received, the method ends at operation 710. When, however, an ACK signal is not received, an error message indicating a failed upgrade attempt is generated by the device and/or one or more other devices included in the fire and security system at operation 720, and the method ends at operation 710.

As used herein, the term "module" refers to an application specific integrated circuit (ASIC), an electronic circuit, a microprocessor, a computer processor (shared, dedicated, or group) and memory that executes one or more software or firmware programs, a combinational logic circuit, a microcontroller including various inputs and outputs, and/or other suitable components that provide the described functionality. The module is configured to execute various algorithms, transforms, and/or logical processes to generate one or more signals of controlling a component or system. When implemented in software, a module can be embodied in memory as a non-transitory machine-readable storage medium readable by a processing circuit (e.g., a microprocessor) and storing instructions for execution by the processing circuit for performing a method. A controller refers to an electronic hardware controller including a storage unit capable of storing algorithms, logic or computer executable instruction, and that contains the circuitry necessary to interpret and execute instructions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A control system comprising:
at least one control panel in signal communication with at least one data control loop; and
at least one connected device in signal communication with the at least one control panel via the at least one data control loop, the at least one connected device including a memory unit having a free memory area that stores first data and an active memory area that stores second data different from the first data,
wherein, in response to operating the least one connected device according to the second data, the at least one connected device receives updated data delivered by the at least one of the control panel over the data control loop, and replaces the first data stored in the free memory data with the updated data.

2. The control system of claim 1, wherein in response to initially connecting the connected device to the data control loop, a device controller installed in the connected device is configured to select the second data from the active memory area and initiate operation of the connected device according to the second data.

3. The control system of claim 2, wherein after initiating operation of the connected device according to the second data, the device controller replaces the first data stored in the free memory area with the updated data received via the at least one data control loop.

4. The control system of claim 3, wherein the first data corresponds to a first firmware program and, and the second data corresponds to a second firmware program different from the first firmware program.

5. The control system of claim 3, wherein the device controller initiates operation of the at least one connected device in response to selecting first data from the active memory area, and replaces second data stored in the free memory area.

6. The control system of claim 5, wherein the connected device transitions the free memory area into an active memory area, and operates according to data stored in the transitioned active memory area, and transitions the active memory area into a free memory area and replaces the data in the transitioned free area with updated data.

7. The control system of claim 6, wherein replacing the second device data further includes receiving the second updated device data via the addressable control loop in response to a command from the control panel.

8. The control system of claim 1, wherein in response to initially connecting the connected device to the data control loop, the device controller is configured to select the second device data from the active memory area and invoke operation of the connected device according to the second device data.

9. The control system of claim 8, wherein after invoking operation of the connected device according to the second device data, the device controller replaces the first device data stored in the free memory area with updated data.

10. The control system of claim 1, wherein the data control loop is an addressable control loop.

11. A connected device installed in a control system, the connected device comprising:
a data input port that receives data from a data control loop installed in the control system;
a free memory area configured to store a first firmware program;
an active memory area different from the free memory area, the active memory area configured to store a second firmware program that is different from the first firmware program; and
a device controller configured to operate the connected device in response to executing the second firmware program, receive an updated firmware program from the data control loop in response to operating the connected device according to the second firmware program, and replace the first firmware program stored in the free memory data with the updated firmware program while operating according to the second firmware program.

12. The connected device of claim 11, wherein in response to initially connecting the connected device to the data control loop, the device controller is configured to select the second firmware program from the active memory area and initiate operation of the connected device according to the second firmware program, and after initiating operation of the connected device according to the second firmware program the device controller replaces the first firmware program stored in the free memory area with updated firmware program received via the at least one data control loop.

13. The connected device of claim 12, wherein the data control loop is an addressable control loop, and wherein the device controller operates the connected device in response to selecting the first firmware program from the free memory area, and replaces second firmware program stored in the active memory area.

14. The connected device of claim 13, wherein replacing the second firmware program includes selecting the first firmware program, invoking operation of the connected device according to the first firmware program, and replacing the second firmware program with second updated firmware program while the connected device operates according to the first firmware program.

15. The connected device of claim 11, wherein in response to initially connecting the connected device to the data control loop, the device controller is configured to select the second firmware program from the active memory area and initiate operation of the connected device according to the second firmware program, and after initiating operation of the connected device according to the second firmware program, the device controller replaces the first firmware program stored in the free memory area with updated firmware program.

* * * * *